US010354121B2

(12) United States Patent
Moriceau et al.

(10) Patent No.: US 10,354,121 B2
(45) Date of Patent: Jul. 16, 2019

(54) METHOD FOR VERIFYING THE VERACITY OF A FINGER

(71) Applicant: IDEMIA IDENTITY & SECURITY FRANCE, Issy les Moulineaux (FR)

(72) Inventors: Damien Moriceau, Issy les Moulineaux (FR); Cécile Jourdas, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 65 days.

(21) Appl. No.: 15/741,930

(22) PCT Filed: Jul. 4, 2016

(86) PCT No.: PCT/EP2016/065738
§ 371 (c)(1),
(2) Date: Jan. 4, 2018

(87) PCT Pub. No.: WO2017/005703
PCT Pub. Date: Jan. 12, 2017

(65) Prior Publication Data
US 2018/0204044 A1 Jul. 19, 2018

(30) Foreign Application Priority Data
Jul. 9, 2015 (FR) .................................. 15 56531

(51) Int. Cl.
*G06K 9/00* (2006.01)
(52) U.S. Cl.
CPC ..... *G06K 9/00107* (2013.01); *G06K 9/00087* (2013.01); *G06K 9/00208* (2013.01); *G06K 9/00899* (2013.01)
(58) Field of Classification Search
CPC ........... G06K 9/00107; G06K 9/00087; G06K 9/00208; G06K 9/00899
See application file for complete search history.

(56) References Cited

U.S. PATENT DOCUMENTS

2006/0120576 A1* 6/2006 Chen ................... G06K 9/00033
382/124
2007/0211926 A1* 9/2007 Shinzaki ............ G06K 9/00107
382/124

(Continued)

FOREIGN PATENT DOCUMENTS

WO 2010/036403 A2 4/2010

OTHER PUBLICATIONS

Sep. 6, 2016 Search Report issued in International Patent Application No. PCT/EP2016/065738.

(Continued)

*Primary Examiner* — John B Strege
(74) *Attorney, Agent, or Firm* — Oliff PLC; R. Brian Drozd

(57) ABSTRACT

Provided is a method for verifying the veracity of a finger by a verification device including a projection device projecting a pattern of parallel lines orthogonal to the longitudinal direction of the finger, a capture device capturing an image of the finger and of the pattern, and a processing unit. The method includes: an illumination step in which the projection device illuminates the finger with the pattern; a contactless capture step in which the capture device captures a pattern image of the projected pattern; a fringe-extraction step in which the processing unit extracts fringes from the pattern image; a feature-calculation step in which the processing unit calculates a feature relating to the physical structure of the fringes; a comparison step during which the processing unit compares the calculated feature with reference values; and a decision-making step in which the processing unit makes a decision regarding the veracity of the finger.

6 Claims, 3 Drawing Sheets

(56) References Cited

U.S. PATENT DOCUMENTS

| | | | | |
|---|---|---|---|---|
| 2008/0002860 A1* | 1/2008 | Super | G06K 9/00375 | 382/114 |
| 2008/0095412 A1* | 4/2008 | Fujieda | A61B 5/02007 | 382/124 |
| 2009/0232368 A1* | 9/2009 | Niinuma | G06K 9/00107 | 382/124 |
| 2011/0058023 A1* | 3/2011 | Boles | G01B 11/2513 | 348/46 |
| 2011/0064282 A1* | 3/2011 | Abramovich | G06K 9/00033 | 382/124 |
| 2011/0216948 A1* | 9/2011 | Yalla | G06K 9/00006 | 382/125 |
| 2011/0222755 A1* | 9/2011 | Kimura | G06K 9/525 | 382/141 |
| 2014/0049373 A1 | 2/2014 | Troy et al. | | |
| 2014/0294262 A1* | 10/2014 | Schuckers | G06K 9/00114 | 382/125 |

OTHER PUBLICATIONS

Zhang et al; "3D Fingerprint Reconstruction;" 3D Biometrics; Jan. 1, 2013; XP05274963; pp. 195-216.

Zhang et al; "3D Fingerprint Identification System;" 3D Biometrics; Jan. 1, 2013; XP055274965; pp. 217-230.

Di Martino et al; "3D Curvature Analysis with a Novel One-Shot Technique;" The Institute of Electrical and Electronics Engineers, Inc. (IEEE) Conference Proceedings; Oct. 1, 2014; XP055274533; 5 pp.

Marasco et al; "A Survey on Anti-Spoofing Schemes for Fingerprint Recognition Systems;" ACM Computing Surveys; vol. 47; No. 2; Article A; Sep. 1, 2014; XP055229904; 36 pp.

* cited by examiner

METHOD FOR VERIFYING THE VERACITY OF A FINGER

The present invention relates to a method for verifying the veracity of one or more fingers, as well as a verification device suitable for implementing such a verification method.

It finds an application in the field of biometric recognition and in particular in the field of identification by analysing fingerprints.

In the context of an identification/authentication of a person by analysing his fingerprint, it is preferable to ensure that the finger is a real finger rather than a decoy presented for the purpose of deceiving the identification/authentication system.

There exist numerous solutions for verifying that the finger is truly a finger.

One particular type of fraud consists of sticking or pressing an additional layer on the finger. This layer may for example be a layer of latex, silicone or gelatine or a printed sheet wound or just placed on the finger.

The document US-A-2014/049373 and the document WO-A-2010/036403 disclose methods for verifying the veracity of a finger by relying on a three-dimensional reconstruction of the finger from projected fringes and then an analysis of this reconstruction. Such methods therefore require relatively lengthy calculation times because of the reconstruction.

In particular, the use of the methods of the documents cited above requires a precise calibration between the projector and the camera.

The document US-A-2014/049373 proposes in particular the analysis of three-dimensional ([0048]) and two-dimensional ([0049]) features. In the latter case, there is no projection of a pattern, but the projection of a stream of light of a particular colour.

It is advantageous to find a solution that is quicker and better suited for detecting such frauds, in particular based on two-dimensional data.

One object of the present invention is to propose a method for verifying the veracity of a finger that does not have the drawbacks of the prior art and which in particular allows to provide better detection of a decoy in the case of a contactless verification device.

To this end, there is proposed a method for verifying the veracity of a finger by a verification device comprising a projection device designed to project a pattern consisting of a plurality of lines which are parallel to one another on the finger and orthogonal to the favoured longitudinal direction of the finger, a capture device designed to capture an image of the finger and of the pattern, and a processing unit, the method comprising:

- an illumination step in which the projection device illuminates the finger with the pattern,
- a contactless capture step in which the capture device captures a pattern image of the projected pattern on the finger,
- a fringe-extraction step in which the processing unit extracts fringes from the pattern image thus captured,
- a feature calculation step in which the processing unit calculates at least one feature relating to the physical structure of the fringes,
- a comparison step during which the processing unit compares the calculated feature or features thus calculated with reference values of these features, and
- a decision-making step in which the processing unit makes a decision regarding the veracity of the finger from the result of the comparison step.

Such a method therefore does not require a three-dimensional reconstruction of the finger and therefore offers a saving in time.

Advantageously, the optical axis of the projection device and the optical axis of the capture device are concurrent.

According to a particular embodiment, the feature-calculation step consists of calculating, for each fringe and for each point on said fringe, the sagitta at said point, and then calculating, for each fringe, the variance in the sagittas thus calculated, and then calculating, over all the fringes, the average of the variances in the sagittas thus calculated, and the physical feature calculated is this average.

According to another particular embodiment, the feature-calculation step further consists, first of all of calculating, for each fringe and for each point on said fringe, the sagitta at said point, and then calculating, for each fringe, the average of the sagittas thus calculated, and then, over all the fringes, calculating the average of the averages of the sagittas thus calculated, and the physical feature calculated is the average of the averages.

Advantageously, the feature-calculation step further consists of calculating, for each fringe, the parameters a, b and c of its modelling in the form $x=ay^2+by+c$, and then, over all the fringes, calculating the average of the parameters 'a' thus calculated, and the physical feature calculated is this average.

Advantageously, the verification method comprises, between the fringe-extraction step and the feature-calculation step, a binarization step followed by a skeletonisation step, and the feature-calculation step further consists of calculating, for each fringe, the parameters a, b and c of its modelling in the form $x=ay^2+by+c$, and then, for each fringe, calculating, for each point on said fringe, the error between the actual fringe and the modelled fringe with the formula $(x_i-ay_i^2-by_i-c)^2$ where 'i' is the index of the point on the fringe in question, and then, on each fringe, the average of this error, and then, over all the fringes, calculating the average of the average errors thus calculated, and the physical feature calculated is then this average.

The invention also proposes a device for verifying the veracity of a finger, the verification device comprising means for implementing the verification method according to one of the preceding variants.

The features of the invention mentioned above, as well as others, will emerge more clearly from a reading of the following description of an example embodiment, said description being given in relation to the accompanying drawings, among which:

FIG. 1 shows a device for verifying the veracity of a finger according to the invention, FIG. 2 shows an algorithm of a method for verifying the veracity of a finger according to the invention, FIG. 3a shows an image of a pattern projected onto real fingers, FIG. 3b shows an image of a pattern projected onto a paper fraud, FIG. 3c shows an image of a pattern projected onto a latex fraud, FIG. 4a shows an image of fringes extracted from the image of the pattern in FIG. 3a, FIG. 4b shows an image of the fringes extracted from the image of the pattern in FIG. 3b, FIG. 4c shows an image of the fringes extracted from the image of the pattern in FIG. 3c, FIG. 5 is an example of a fringe, FIG. 6 shows an example of implementation of the verification device according to the invention, and FIG. 7 shows a diagram of results for the example implementation in FIG. 6.

The principle of the invention consists first of all of projecting onto the finger a pattern consisting of lines parallel to each other and orthogonal to the favoured longitudinal direction of the finger, and then capturing an image of the finger with the lines thus projected, and analysing the structures of the lines captured on the image in order to deduce therefrom the veracity of the finger.

Thus, when an additional layer is stuck on the finger, this causes an excess thickness and a discontinuity between the surface of the finger and the surface of the layer, and detecting such a discontinuity allows to detect the fraud. In this case, some lines will present a discontinuity.

Furthermore, when the decoy consists of a sheet of paper simply placed on the finger, the projected lines will be rectilinear whereas, in the case of a finger, they will have a certain curvature.

FIG. 1 shows a verification device 100 intended to verify whether or not the finger 50 is a real finger.

The verification device 100 comprises a projection device 106 designed to project a pattern 52 consisting of a plurality of parallel lines on the finger 50, a capture device 102 provided for capturing an image of the finger 2 and of the pattern 52, and a processing unit 104.

The capture device 102 comprises at least one capture means such as for example a camera.

The capture means 102 captures without contact an image of the pattern 52 thus projected onto the finger 50. The pattern image 302a-c is a digital image.

The processing unit 104 extracts the fringes of the pattern image 302a-c thus obtained.

Figure 4A:
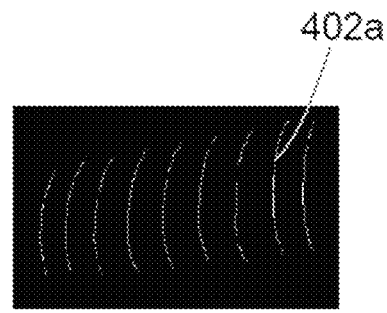

FIG. 4a shows an image of fringes 402a calculated from the pattern image 302a.

Figure 4B:
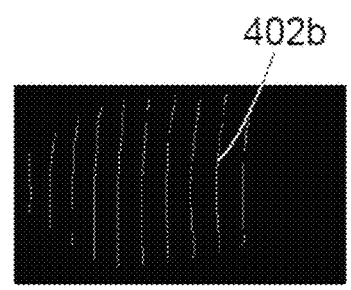
Figure 3C:
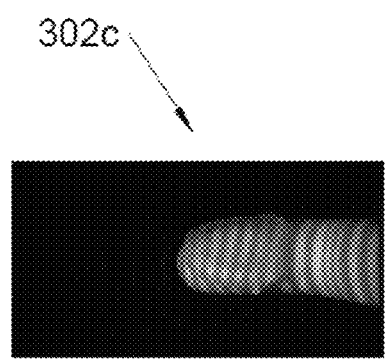
FIG. 3c shows a pattern image 302c for a finger 50 covered with a latex fraud.

FIG. 4b shows a fringe image 402b calculated from the pattern image 302b.

Figure 4C:
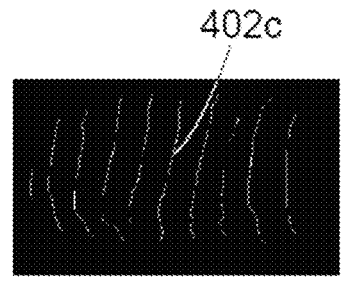

FIG. 4c shows a fringe image 402c calculated from the pattern image 302c.

Analysing the fringes 402a-c shows clearly that the frauds can be detected from the physical structure of said fringes 402a-c. The fringes 402a of a real finger 50 are curved, while the fringes 402b of a paper decoy are rectilinear and some fringes 402c of a silicone decoy are irregular because of the step between the surfaces of the finger 50 and the layer of latex.

Figure 2:
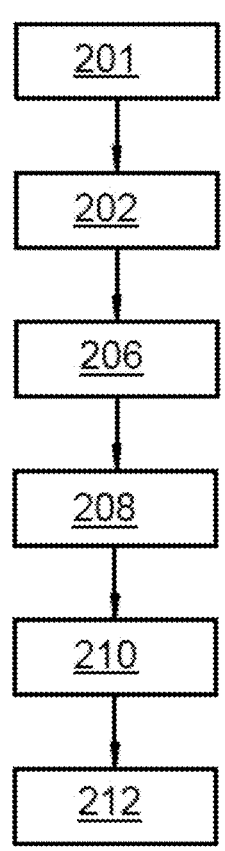

FIG. 2 shows an algorithm of a method 200 for verifying the validity of a finger 50 implemented by the verification device 100.

The verification method 200 comprises:
- an illumination step 201 in which the projection device 106 illuminates the finger 50 with the pattern 52,
- a capture step 202 in which the capture device 102 captures a pattern image 302a-c of the projected pattern 52 on the finger 50,
- a fringe-extraction step 206 in which the processing unit 104 extracts the fringes 402a-c from the pattern image 302a-c thus captured,
- a feature-calculation step 208 in which the processing unit 104 calculates at least one feature relating to the physical structure of the fringes 402a-c,
- a comparison step 210 during which the processing unit 104 compares the feature or features thus calculated with reference values of these features, and
- a decision-making step 212 in which the processing unit 104 makes a decision regarding the veracity of the finger 50 from the result of the comparison step 210.

The pattern 52 is preferably a single colour in order to allow to acquire additional information on other channels, for example the fingerprint of the finger under uniform illumination. The fringe-extraction step 206 consists for example of extracting the fringes corresponding to the black/white or white/black edges of the pattern image.

According to a particular embodiment of the invention, the fringe-extraction step 206 consists, using the pattern image 302a-c, for example of applying a Canny-Deriche horizontal filter in order to extract therefrom the fringes 402a-c. It is also possible to use a horizontal contour detection of the Sobel, Prewitt type or any other suitable image processing method, in particular Fourier space filtering.

In order to facilitate the subsequent processing of the fringes 402a-c during the feature-calculation step 208, the image of the fringes 402a-c is binarised. The binarization is carried out for example by means of Otsu's method followed by a skeletonisation step. The method then comprises, between the fringe-extraction step 206 and the feature-calculation step 208, a binarization step followed by a skeletonisation step.

In order to obtain more relevant results, it is preferable to eliminate the elements of the image that do not with certainty constitute fringes 402a-c but are other elements resulting for example from optical elements or segmentation of the finger. Furthermore, it is also preferable to ensure that the fringes have not been broken up around discontinuities in the finger. Thus criteria of orientation and length in the first case and proximity in the second case allow respectively to eliminate or recombine pieces of fringes. Preferentially, the fringes are preserved only in a zone roughly encompassing the first phalanx of the finger.

In the case where the pattern image 302a-c relates to a plurality of fingers, it is preferable to isolate each finger by means of a segmentation step prior to the extraction step. The segmentation step may for example be carried out by means of an Otsu algorithm applied to the sub-sampled image.

The physical features are related to the form of the fringes or to irregularities in the fringes.

The form of the fringes makes it possible to differentiate a real finger 50 from a paper decoy (FIG. 4b). The presence of roughnesses makes it possible to differentiate a real finger 50 from a protruding latex decoy (FIG. 4c).

Figure 5:
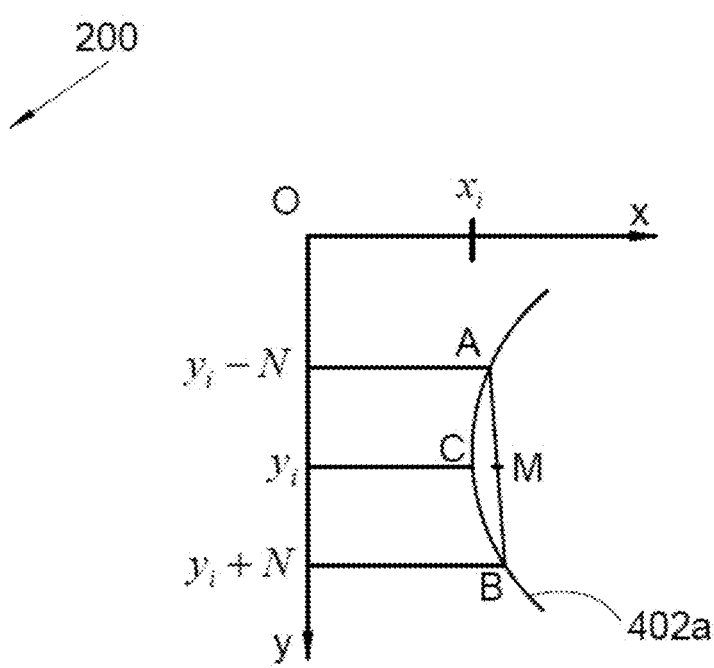
Figure 3A:
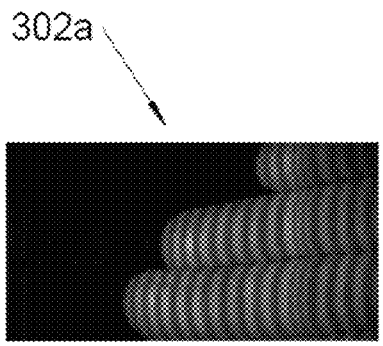
FIG. 3a shows a pattern image 302a for a real finger 50.

FIG. 5 shows an example of a fringe 402a as extracted during the extraction step in a reference frame (O, x, y), where x is parallel to the longitudinal axis of the finger and y is an axis transverse to the finger in the plane of the pattern image 302a. Some features that are described below are based on the sagittas that can be calculated from the fringes 402a-c.

The point C ($x_i$, $y_i$) is a point on the fringe 402a. The points A and B are symmetrical points of the fringe 402a having respectively as their ordinate $y_i$–N and $y_i$+N, where N is a relatively small fixed number of pixels that is for example 5 to 10 pixels. M is the middle of the segment [A, B] and the sagitta is the signed distance d(C, M).

According to a particular embodiment, the feature-calculation step 208 consists first of all of calculating, for each fringe 402a-c and for each point on said fringe 402a-c, the sagitta at said point, and then, for each fringe 402a-c, calculating the variance of the sagittas thus calculated, and then calculating, over all the fringes 402a-c, the average of the variances of the sagittas thus calculated. The physical feature calculated is then this average of the variances or in the same way the standardised average of the variance of the sagittas.

According to another particular embodiment, the feature-calculation step 208 consists first of all of calculating, for each fringe 402a-c and for each point on said fringe 402a-c, the sagitta at said point, and then, for each fringe 402a-c, calculating the average of the sagittas thus calculated, and then, over all the fringes 402a-c, calculating the average of the averages of the sagittas thus calculated. The physical feature calculated is then this average of the averages.

According to another particular embodiment, each fringe 402a-c may be modelled in the parabolic form $x=ay^2+by+c$, the feature-calculation step 208 then consists of calculating, for each fringe 402a-c, the parameters a, b and c of its modelling, and then, over all the fringes 402a-c, calculating the average of the parameters 'a' thus calculated. The physical feature calculated is then this average.

According to another embodiment, each fringe 402a-c may be modelled in the parabolic form $x=ay^2+by+c$, the feature-calculation step 208 then consists of calculating, for each fringe 402a-c, the parameters a, b and c of its modelling. The feature-calculation step 208 then consists of calculating, for each fringe 402a-c, the parameters a, b and c of its modelling, and then, for each fringe 402a-c, calculating, for each point on said fringe 402a-c, the error between the actual fringe 402a-c and the modelled fringe with the formula $(x_i a y_i^2 - b y_i - c)^2$ where 'i' is the index of the point on the fringe in question, and then, on each fringe 402a-c, the average of this error, and then, over all the fringes 402a-c, calculating the average of the average errors thus calculated. The physical feature calculated is then this average. The values $x_i$ and $y_i$ are the coordinates of the point of index 'i' of the fringe in question and which are obtained after the binarization step and the skeletonisation step.

As specified at the feature-calculation step 208, it is possible to calculate one or more of the features described above.

The comparison step 210 then consists of comparing the value of each feature with reference values of these features.

The comparison step may be implemented by any suitable comparison means such as for example a neural network, a support vector machine (SVM) or a decision tree.

The comparison means conventionally require a learning phase during which the real fingers 50 and fingers 50 covered with decoys are presented in front of a verification device 100, which calculates the particular features to be recorded. Following this learning phase, the comparison means are able to classify each new finger 50 that is presented to it as a real finger or a false finger. Alternatively, the learning may be carried out with only real fingers and an algorithm of the one-class SVM type.

Figure 6:
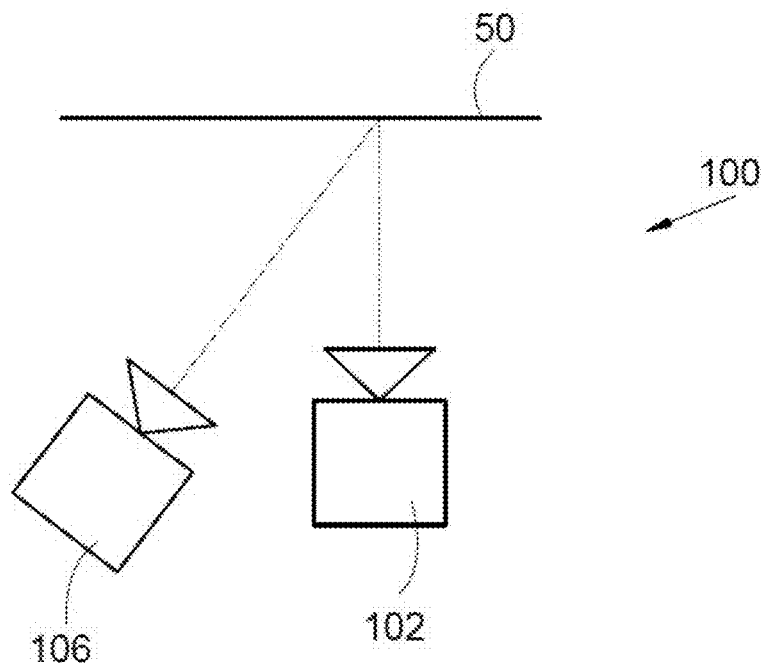

FIG. 6 shows an example of the use of a verification device 100 with a camera 102 and a projection device 106, where the finger 50 is at the intersection of the optical axes of the camera 102 and of the projection device 106, which are not parallel.

In general terms, the optical axis of the projection device 106 and the optical axis of the capture device 102, here the camera 102, are concurrent.

Figure 1:
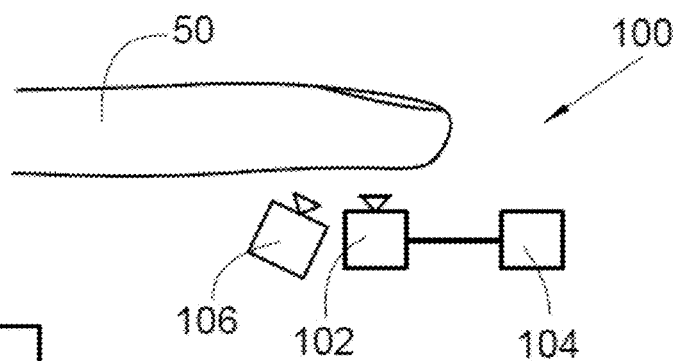

In the embodiment of the invention presented in FIG. 1, the point of intersection of the axes is in a capture volume that is relatively large because the acquisition is done without contact. The capture volume is the volume that is situated opposite the capture device 102 in which the finger 50 can be positioned freely while guaranteeing that the captured image is sharp. This is because, conventionally, in such a case, the finger 50 has a certain freedom of positioning with respect to the capture device 102, according to a particular example, the intersection point is situated at approximately 10 cm from the surface of the finger 50, preferentially at approximately 5 cm and even more preferentially at approximately 2.5 cm. In other words, it can be stated that the optical axis of the projection device 106 and the optical axis of the capture device 102, here the camera 102, are concurrent at the surface of the finger 50.

The camera 102 is here a full HD camera with a focal length of 12.5 mm and a resolution of around 600 dpi. The distance between the finger 50 and the camera 102 is around 200 mm.

The angle between the optical axis of the camera 102 and the optical axis of the projection device 106 is between 10° and 60°, preferentially between 20° and 40°, and more preferentially equal to 26°.

With such an installation, there are between 1 and 30 fringes depending on the length of the finger 50, and, in the majority of cases, between 10 and 20.

As specified above with N chosen between 5 and 10 pixels, with projected lines 1.6 mm wide and spaced apart by 1.6 mm and with an RBF kernel SVM classifier, the results are shown in FIG. 6.

Figure 7:
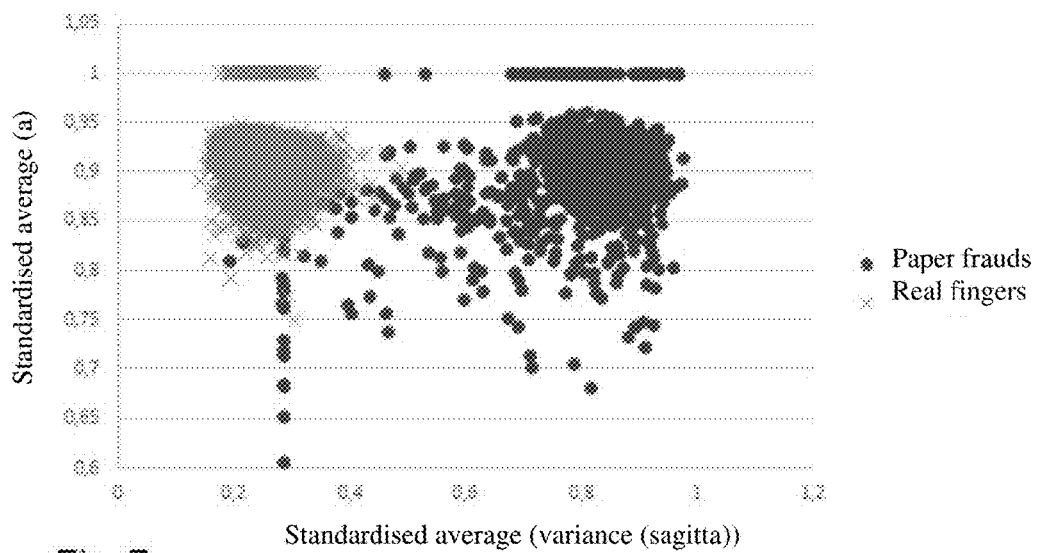

FIG. 7 shows a combination of two combined analyses, namely on the x axis the standardised average of the variance of the sagittas and on the y axis the standardised average of the parameters 'a' of the parabolic form.

Figure 3B:
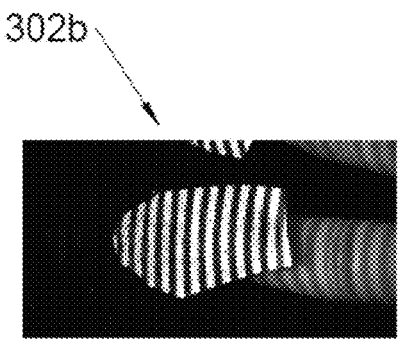
FIG. 3b shows a pattern image 302b for a finger 50 covered with a paper fraud.

The results in FIG. 7 show the detection of paper frauds (FIG. 3b) with respect to real fingers, with 84% fraud detection and 1% false rejects (real fingers detected as fraud). In FIG. 7, the samples shown by crosses represent the real fingers and are collected together at the top part and on the left, and the samples represented by dots represent the paper frauds and are collected together at the top part and on the right.

The invention claimed is:

1. A method for verifying the veracity of a finger by a verification device comprising a projection device designed to project a pattern comprising of a plurality of lines which are parallel to one another on the finger and orthogonal to the favoured longitudinal direction of the finger, a capture device designed to capture an image of the finger and of the pattern, and a processing unit, the method comprising: —illuminating the projection device the finger with the pattern, —executing a-contactless capture in which the capture device captures a pattern image of the projected pattern on the finger, —executing a-fringe-extraction in which the processing unit extracts fringes from the pattern image thus captured, —executing a-feature-calculation in which the processing unit calculates at least one feature relating to the physical structure of the fringes, —carrying out comparison with the processing unit between the calculated feature or features thus calculated with reference values of these features, —making a decision with the processing unit regarding the veracity of the finger from the result of the comparison wherein the feature-calculation comprises calculating, for each fringe and for each point on said fringe, the sagitta at said point, and then calculating, for each fringe, the variance of the sagittas thus calculated, and then calculating, over all the fringes, the average of the variances of the sagittas as calculated, and in that the physical feature calculated is this average.

2. The verification method according to claim 1, wherein the optical axis of the projection device and the optical axis of the capture device are concurrent.

3. The verification method according to claim 1, wherein the feature-calculation further comprises, first of all of calculating, for each fringe and for each point on said fringe, the sagitta at said point, and then, for each fringe, calculating the average of the sagittas thus calculated, and then, over all the fringes, calculating the average of the averages of the sagittas thus calculated, and in that the physical feature calculated is this average of the averages.

4. The verification method according to claim 1, wherein the feature-calculation further comprises calculating, for each fringe, the parameters a, b and c of its modelling in the form $x=ay^2+by+c$, and then, over all the fringes, calculating the average of the parameters 'a' thus calculated, and in that the physical feature calculated is this average.

5. The verification method according to claim 1, further comprising between the fringe-extraction step and the feature-calculation, a binarization followed by a skeletonisation, wherein the feature-calculation further comprises calculating, for each fringe, the parameters a, b and c of its modelling in the form $x=ay^2+by+c$, and then, for each fringe, calculating, for each point on said fringe, the error between the actual fringe and the modelled fringe with the formula $(x-ay_1^2-by_1-c)^2$ where 'i' is the index of the point on the fringe in question, and then, on each fringe, the average of this error, and then, over all the fringes, calculating the average of the average errors thus calculated, and in that the physical feature calculated is then this average.

6. A device for verifying the veracity of a finger, the verification device comprising circuitry adapted for implementing the verification method according to claim 1.

* * * * *